United States Patent [19]

Everett

[11] 4,314,210
[45] Feb. 2, 1982

[54] MODE-LOCKING AND CHIRPING SYSTEM FOR LASERS

[75] Inventor: Patrick N. Everett, Concord, Mass.

[73] Assignee: Jersey Nuclear-Avco Isotopes, Inc., Bellevue, Wash.

[21] Appl. No.: 96,747

[22] Filed: Nov. 23, 1979

[51] Int. Cl.³ .............................................. H01S 3/10
[52] U.S. Cl. ........................................ 372/18; 372/28
[58] Field of Search ................ 331/94.5 ML, 94.5 M, 331/94.5 S, 94.5 N; 330/7.51; 350/356; 356/350; 307/425

[56] References Cited

U.S. PATENT DOCUMENTS 3,412,251 11/1968 Hargrove .................. 331/94.5 ML
3,833,286 9/1974 Deserno et al. ............. 331/94.5 N

OTHER PUBLICATIONS

"Pulse Chirping in a Nd:YAG Laser" by C. Kennedy, *IEEE Jour. Quant. Elect.* vol. QE-10, No. 6, p. 528–530 (Jun. '74).

"Pico-Second Laser Pulse Generator" by Carlson, *IBM Tech. Disc. Bull.*, vol. 16, No. 10, Mar. '74.

*Primary Examiner*—William L. Sikes
*Assistant Examiner*—Leon Scott, Jr.
*Attorney, Agent, or Firm*—Weingarten, Schurgin & Gagnebin

[57] ABSTRACT

A single electro-optic device is provided for simultaneously mode-locking and chirping the output of a laser by simultaneously applying to the electrodes of the electro-optic device a periodic signal superimposed on a voltage ramp. The electro-optic device in general utilizes a crystal of the type which changes refractive index in accordance with an applied voltage. As a result, FM mode-locking is achieved through the use of the periodic signal, whereas mode lines are displaced or shifted in frequency during the generation of the laser output by virtue of the changing bias supplied by the voltage ramp.

13 Claims, 3 Drawing Figures

MODE-LOCKING AND CHIRPING SYSTEM FOR LASERS

FIELD OF THE INVENTION

The present invention is concerned with providing both mode-locking and frequency chirping of spectra from either single-mode or multi-mode laser sources and, more particularly, to a single electro-optical element interposed in a laser cavity and a system for driving the electro-optical element, so as to simultaneously provide both mode-locking and chirping.

BACKGROUND OF THE INVENTION

Multi-mode lasers having outputs with a large number of frequency or spectral components called mode lines have been utilized in the past for a variety of applications. Whether these lasers are mode-locked or not, the existence of multiple modes results in output pulses from the lasers having discrete or distinct spectra at closely spaced frequencies in the spectral region to which the laser is tuned. In the case of a mode-locked laser, the envelope of this comb-like spectral distribution is relatively smooth, and consistent as a function of time. If a laser is not mode-locked, the intensities of the various modes suffer wild fluctuations from pulse to pulse, in a random manner related to the noise statistics in the laser cavity. While in many applications production of a randomly fluctuating comb-like spectral response is useful in some applications it is desirable to both reduce the random fluctuations and to displace or shift the spectra of the output signal from the laser during the production of the output signal so that the output signal appears to have a continuous frequency spectrum within the spectral region to which the laser is tuned. In this technique the laser is first mode-locked and then the mode lines are in effect "smeared out" to give the output signal an energy vs. frequency continuum.

This combined smoothing of the envelope and smearing out of the spectra in multi-mode lasers is important in certain types of isotope separation processes in order to achieve maximum efficiency. One such process is described in U.S. Pat. No. 3,772,519 for a method and apparatus for the separation of isotopes by R. H. Levy et al. In this patent a method is disclosed for isotope separation in which an environment containing a plurality of uranium isotopes is irradiated with laser radiation of a particular frequency to selectively excite the particles of the desired isotope type. When certain particles are selectively excited, the selectively excited particles may be separated as disclosed in the patent. For optimum efficiency, the laser isotope separation process, as shown in the Levy patent, prefers excitation radiation with energy distributed throughout the band width of the absorption structure of the U-235 component of uranium vapor rather than the series of discrete mode frequencies typical of most laser radiation.

The subject invention ensures such a preferred continuous spectral distribution of energy over the band-width of interest, and removes the problem of severe fluctuations in the envelope of the distribution.

The subject invention also has application to atomic and molecular systems in which the exact position of the spectral components or transitions, cannot easily be either calculated or verified experimentally. Uncertainty in spectral line position may occur through Doppler broadening, Zeeman shift or cross-coupling interactions not thoroughly understood.

It is well known that mode-locking has a strong stabilizing effect on the distribution of intensity among the oscillating modes of a laser. Sweeping of the mode frequencies during the pulse to obtain effective filling of the spectral gaps on a time-integrated basis is known as "chirp". Representative methods of causing such a chirp are shown in U.S. Pat. No. 3,611,182, issued to E. B. Treacy, involving the utilization of a rotating mirror, and U.S. Pat. No. 4,088,898, issued to M. L. Stitch which utilizes a rotating optical wedge which varies in thickness and presents the varying thickness to an optical path within the resonator of the laser during the generation of a laser pulse. The latter of these two patents is assigned to the assignee of the present invention.

Additionally, broadening of the spectral response of multi-mode lasers is elaborated upon in co-pending U.S. patent application Ser. No. 862,409 filed Dec. 29, 1977 by Hans A. Bethe and Ching Sung Chang, the application also having been assigned to the assignee of this application.

Finally, chirping may be accomplished by the utilization of an electro-optic crystal in which the crystal is interposed in the laser cavity. This crystal may be a low resonant KD*P single crystal. In essence, when a voltage is applied across the crystal the index of refraction within the crystal changes. When this occurs, the effective cavity dimension is lengthened slightly. The effect of varying the cavity length during the production of a pulse, in essence, shifts the mode-lines so that a virtually continuous frequency vs. amplitude spectrum results on a time-integrated basis. It will be appreciated that the normal output characteristic of the laser is a series of spectral lines which are closely spaced with the distance between the lines being $c/2L$, where c is the speed of light and L is the cavity length. For lasers in general use, this spacing lies between 50 MHz and 500 MHz. It will therefore be appreciated that the shifting of the lines need not be great during the production of a pulse, in order to achieve the spectral smearing of the spectra from the laser.

The combination of mode-locking and chirp is valuable, because the mode-locking ensures a relatively uniform filling of the possible mode-structure of the laser in the band-width of interest, and then the chirping causes effective filling of the gaps between the modes. If mode-filling is absent, then the spectral envelope is very erratic. If chirp is absent, then most of the spectrum is empty because the mode-widths are much narrower than the gaps between the modes.

Since the subject invention involves mode-locking, a general discussion of mode-locking is now presented. As discussed in U.S. Pat. No. 3,935,543 issued to Ronald G. Eguchi, et al. on Jan. 27, 1976, which describes mode-locking, the frequencies of the axial modes of a laser cavity are determined by the condition that an integer number of optical half wave-lengths must fit into the cavity length L, so that the frequency difference is $c/2L$. Mode-locking is a process by which the axial modes of a laser cavity can be induced to oscillate with their phases "locked" together in such a way that the optical field in the laser consists of a single pulse traveling back and forth in the cavity. Aside from this spontaneous or passive locking, which can sometimes occur due to nonlinear interactions in the laser gain medium, there are two basic active methods for achieving laser mode-locking. Both require the introduction into the laser cavity of the time-varying perturbation, with the frequency of the perturbation being tuned near a value that is a multiple of the laser axial mode difference frequency. Only modes which have sufficient gain in the laser medium to overcome losses in the laser resonator will be able to oscillate. It is only these modes and perhaps some whose gain is slightly below the threshold for oscillation, that can be driven to oscillate with their phases locked together to form a sharp, optical pulse in active mode-locking schemes.

The first type of active mode-locking technique is AM locking, or loss-locking, since it involves an amplitude modulation of the optical modes. This form of mode-locking is achieved by the introduction of a time-varying loss into the laser cavity, and for simplicity, this loss could be imagined to be a very fast shutter which is being opened and closed with a frequency equal to the axial mode frequency difference. Since this frequency difference which is c/2L corresponds to the frequency at which light can traverse a round trip of the cavity, only an optical pulse timed to coincide with the time when the shutter is open can build up in the laser period. This, of course, represents a simplified picture of the loss-locking. In general, a wide variety of methods can be employed to introduce a time-varying amplitude perturbation mechanism into a laser cavity, in order to induce a locking of the phases of the modes in such a way that an optical pulse is produced that travels back and forth in the cavity to coincide with the times when the loss is minimized. For example, AM locking can be achieved by means of an electro-optic crystal. In effect, this arrangement provides for an electro-optic shutter that allows only a pulse with a pre-determined synchronization to build up in the cavity.

The other type of mode-locking is called FM locking, or phase locking. It requires modulation of the optical length of the cavity. It can be shown that such a modulation at, or close to, the frequency interval between successive modes of the laser can result in transfer of energy between these modes. It should be noted that this frequency interval can also be equated to the frequency at which light can traverse a round-trip of the cavity. Furthermore, if the modulation is strong enough, and the frequency is very closely matched to the inter-mode frequency interval, then a phase relationship develops between the modes such that the combined effect of all the modes is equivalent to a single short pulse of light circulating in the cavity; i.e., the exact duplicate result of that obtained with the previously described amplitude modulation. This FM, or phase locking, is commonly achieved by utilizing an electro-optic crystal and varying its refractive index by means of an applied electric field. An electric field applied to an electro-optic crystal produces a change in the optical index of refraction and the phase velocity of light in the medium is equal to c/n wherein c is the velocity of light in a vacuum and n is the index of refraction of the material. Thus, by means of a variable applied electric field, it is possible to modulate the phase velocity of the light in the electro-optic material. In effect, by varying the voltage applied to the crystal, the phase of the light is shifted as it propagates which is equivalent to changing the optical length of the cavity. If the voltage is applied at a frequency near a multiple of the axial mode difference frequency which is c/2L, then the typical mode-locked pulses can appear.

SUMMARY OF THE INVENTION

The subject invention combines the FM mode-locking described above with the chirping available with an electro-optic device by simultaneously providing the same type electro-optic device with a periodically varying signal superimposed on a ramp voltage.

The frequency of the periodic voltage is near a multiple of the axial mode difference frequency, and the ramp voltage is such that a mode line is displaced in a non-periodic fashion by at least that amount which shifts its position to an adjacent mode line. In one embodiment, this is accomplished by an electro-optic crystal in which its index of refraction is varied with a voltage applied via a single pair of electrodes. In effect, the crystal changes the effective cavity length in accordance with a periodic and non-periodic function. The same effect can be provided by an appropriately driven mirror which defines part of the laser cavity. Thus, this invention is not limited to the use of any particular cavity length changing element. In effect, the same physical phenomenon is used to produce both mode-locking and chirping and this is accomplished with a simple element. In the case of an electro-optic crystal, only one pair of electrodes need be utilized.

As part of this invention, it has been found that mode-locking can occur despite chirping and that chirping is effective in smearing out the mode-locked output of the laser.

It is a finding of this invention, moreover, that the same physical effect i.e., change of refraction within an electro-optical crystal, may be "simultaneously" used to mode-lock and chirp the output of a laser. It is particularly important to note that it is not necessary to first mode-lock the laser and then chirp the mode-locked spectra produced.

In short, it has been found that the application of the ramp voltage to the crystal does not destroy the mode-locking characteristic engendered by the application of a simultaneously applied periodically varying signal of the appropriate frequency.

Moreover, only one pair of electrodes need be utilized to provide for the two independent effects as opposed to two pairs of electrodes used to produce two independent effects in the Eguchi et al. patent.

The subject technique can also be used in a laser-pumped-laser configuration in which the pumped laser is provided with the simultaneous chirping and mode-locking, while the pumped laser is mode-locked. This configuration will make the mode-locking more positive in some circumstances.

The subject technique can also be used in an Injection Locked Oscillator (ILO) configuration, where the gross spectral characteristics are determined by the injected light, but the finer spectral details are controlled by the chirping and mode-locking provided in the ILO.

BRIEF DESCRIPTION OF THE DRAWINGS

These and other features of the present invention are more fully described below in the detailed description of the preferred embodiment, and in the accompanying drawing of which.

DETAILED DESCRIPTION

Figure 1:
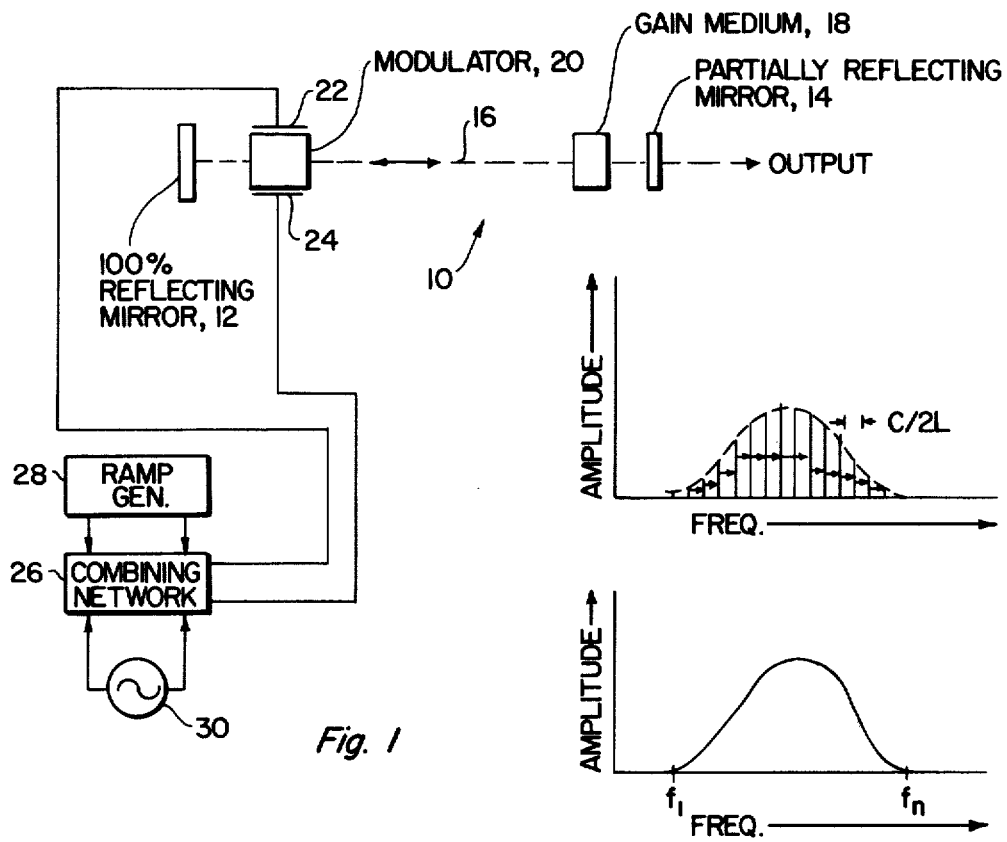
FIG. 1 is a schematic diagram of the subject system, with the graph to the right illustrating displacement of mode-locked spectral lines.

Referring now to FIG. 1, in the embodiment illustrated, a laser 10 includes a cavity defined by a 100 percent reflecting mirror 12 and a partially reflecting mirror 14 located along an optical axis 16. A typical laser useful in the subject application is a dye laser pumped by flashlamps.

Interposed in the laser cavity is a conventional gain medium 18 and an electro-optic modulator 20 having electrodes 22 and 24 as illustrated. It is important that the modulator be placed close to one of the end-mirrors in such a linear cavity. This restriction does not exist in the case of a ring cavity.

As the modulator, a crystal available from Interactive Radiation, Inc., model 620 series electro-optic phase modulator may be used. In this device, the active element is the low-resonance KD*P single crystal with a Brewster angle entrance and exit faces to avoid the optical power handling capability limitations of AR coatings on soft crystal surfaces.

As is well known, an externally applied electric field can induce a birefringence in the optical refractive index of a crystalline medium. For a crystal lacking inversion symmetry, this is a linear electro-optic effect and the change in refractive index is proportional to the applied field. An induced birefringence will lead to phase retardations of a light beam propagating through the medium. As a result, the electro-optic effect may be utilized to produce both mode-locking and chirping.

Thus, it is a property of the crystals described above, that the optical path length between mirror 12 and mirror 14 can in effect be lengthened and shortened by actuation of modulator 20. In order to simultaneously affect FM mode-locking and chirping, electrodes 22 and 24 are coupled to a combining network 26 which combines the outputs of a conventional ramp generator 28 and a source 30 of periodically varying voltage. In one embodiment, both the ramp generator 28 and the source of periodically varying voltage 30 are energized simultaneously with excitation of the laser. Combining network 26 is conventional and includes the usual isolation circuits such that the output of the combining network is the ramp voltage generated by the ramp generator with a periodically varying voltage superimposed thereon. The frequency of the periodically varying voltage is such as to induce FM mode-locking which is a frequency near a multiple of the axial mode difference frequency, c/2L, or a multiple thereof.

In operation, the ramp voltage from generator 28 causes the round-trip optical length of the cavity to cycle through a change of at least one wavelength of the lasing light during the time that the laser is delivering output, typically 1 microsecond. In the preferred embodiment, a swing of several thousand volts is used for the ramp, and the periodically varying voltage is about 50 volts (rms) at about 100 MHz (matched to the cavity transit frequency of the laser light.) Note that a periodically generated ramp may be used and applied along with a continuous source 30 without regard to flashlamp actuation.

In any case, the stimulated emission from gain medium 18 is simultaneously mode-locked and chirped, with the chirping displacing the mode lines. As can be seen in the frequency vs. amplitude graph, FIG. 1, the mode-lines are separated by c/2L, where L is the length of the cavity, and c is the velocity of light, and any variation in path length engendered by modulator 20 will cause a smearing of the mode lines or displacement. This smearing is illustrated in the frequency vs. amplitude graph at the bottom of FIG. 1. Note the frequency continuum produced. This assures that the output of laser 10 will have at least some energy at all frequencies between $f_1$ and $f_n$. Typically, the intervals between modes of such a laser is about 100 MHz and the chirping results in filling of the modes on a time-integrated basis.

With respect to the ramp voltage, this voltage is applied to the modulator such that the optical length of the modulator changes at a rate considerably less than one wavelength per round-trip time of the cavity. With this set of constraints, the modes of the cavity and consequently the discrete frequencies in the output of the laser, will change in frequency at a rate which is proportional to the slope of the ramp. Since the appropriate periodically varying voltage is applied to the modulator, with a period equal to the round-trip time of the cavity, a mode-locked output is simultaneously obtained, characterized by a series of pulses separated in time by the round-trip time of the cavity. The two effects are combined by applying the appropriate periodically varying voltage with a ramped bias. The period of the periodically varying voltage is matched to that of the cavity round-trip time and the slope of the ramped bias is chosen to obtain the desired chirp rate.

It should be noted that the amplitude of this periodically varying voltage need not be such as would cause a full wave-length change in optical round-trip length (2L) of the cavity to obtain good mode-locking, as evidenced by the voltages cited above. The required smoothing of the spectral envelope is actually obtained even when full mode-locking is not developed. The smoothing of the envelope becomes apparent before the characteristic train of short pulses associated with fully achieved mode-locking.

Figure 2:
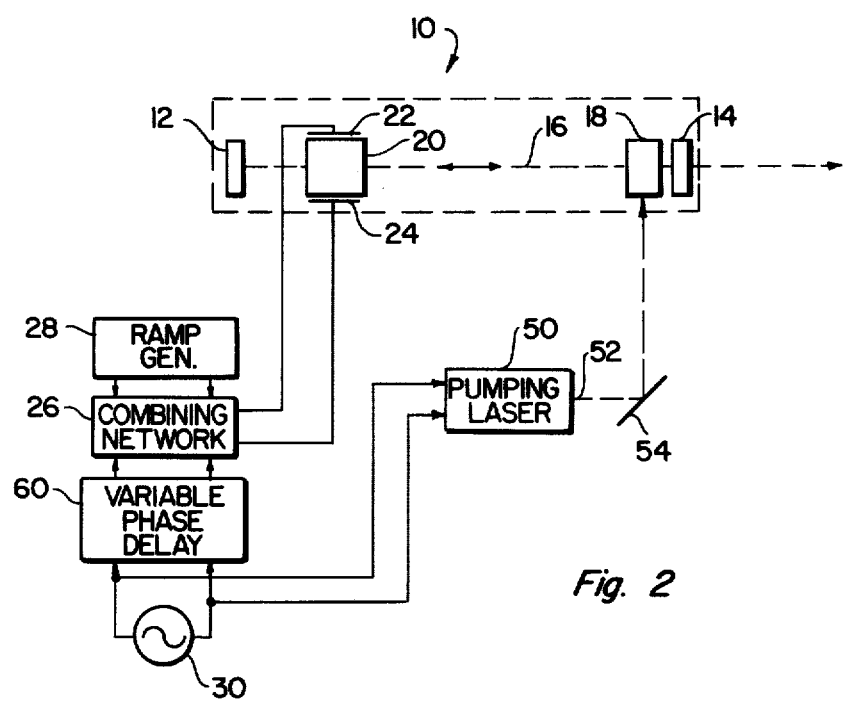
FIG. 2 is a schematic diagram illustrating a laser-pumped configuration, in which the pumped laser is provided with the subject FM mode-locking and chirping technique, while the pumping laser is synchronously mode-locked; and, FIG. 3 is a schematic diagram illustrating an Injection Locked oscillator (ILO) configuration, with the ILO having a ring resonator and with the active medium pumped by flashlamps in which the ILO is provided with the subject FM mode-locking and chirping technique and is injected with lasing light from a laser oscillator.

When a chain of chirped mode-locked pulses is required from the overall system, then it is possible to utilize the laser of FIG. 1 as a pumped laser in a laser-pumped-laser configuration. In FIG. 2, common elements of the laser of FIGS. 1 and 2, carry like reference characters. In this embodiment, gain medium 18 of laser 10 is pumped with energy from a pumping laser 50 having an output 52 redirected by mirror 54 into gain medium 18. Pump laser 50 may be mode-locked in one embodiment.

It might be argued that mode-locking of both lasers is redundant. However, the experience with mode-locked systems is that it is difficult to reliably obtain mode-locking on every pulse. By actively mode-locking both lasers, the reliability is appreciably improved.

Assuming, therefore, in the illustrated embodiment, that the pumping laser generates a sequence of perhaps twenty mode-locked pulses, each lasting approximately a nanosecond or less, and separated by the round-trip of the cavity which might typically be between 5 and 10 nanoseconds, the envelope of the pulse would be the typical Q-switch type envelope with perhaps 100 nanoseconds full width at half maximum height. This train of pulses is then used to pump the active medium of the pumped laser. For the system to function correctly, the round-trip time of the cavity in the pumped laser must be matched to that of the pumping laser. The repetitive pumping by the train of pulses tends to induce a single laser pulse to build up within the pumped laser, which will traverse the gain medium simultaneously with a pump pulse on each pass. Hence, without the active mode-locking within the cavity of laser 10, there will be a tendency for the output to be mode-locked. With the added effect of modulator 20, mode-locking will be certain. It is required that the modulator 20, be modulated with a period matched to that of the modulator which is utilized to mode-lock the pumping laser. Moreover, the round-trip time in the cavities of each of the laser must be matched. Additionally, the phases of the modulation must be appropriately matched to ensure that the systems are acting in unison. The relative phasing is taken into account by the provision of a delay circuit 60 which takes into account the time of flight of light between the cavity of laser 50 and the cavity of laser 10, as well as cable delays. Of course, in order to ensure correct synchronization, it is desirable that the two modulators and the two lasers be driven from the same oscillator with an adjustable phase delay.

When the conditions have been achieved to obtain the mode-locking in the configuration of FIG. 2, then application of the ramp from generator 28 superimposes the chirp in the output of the laser-pumped laser.

Figure 3:
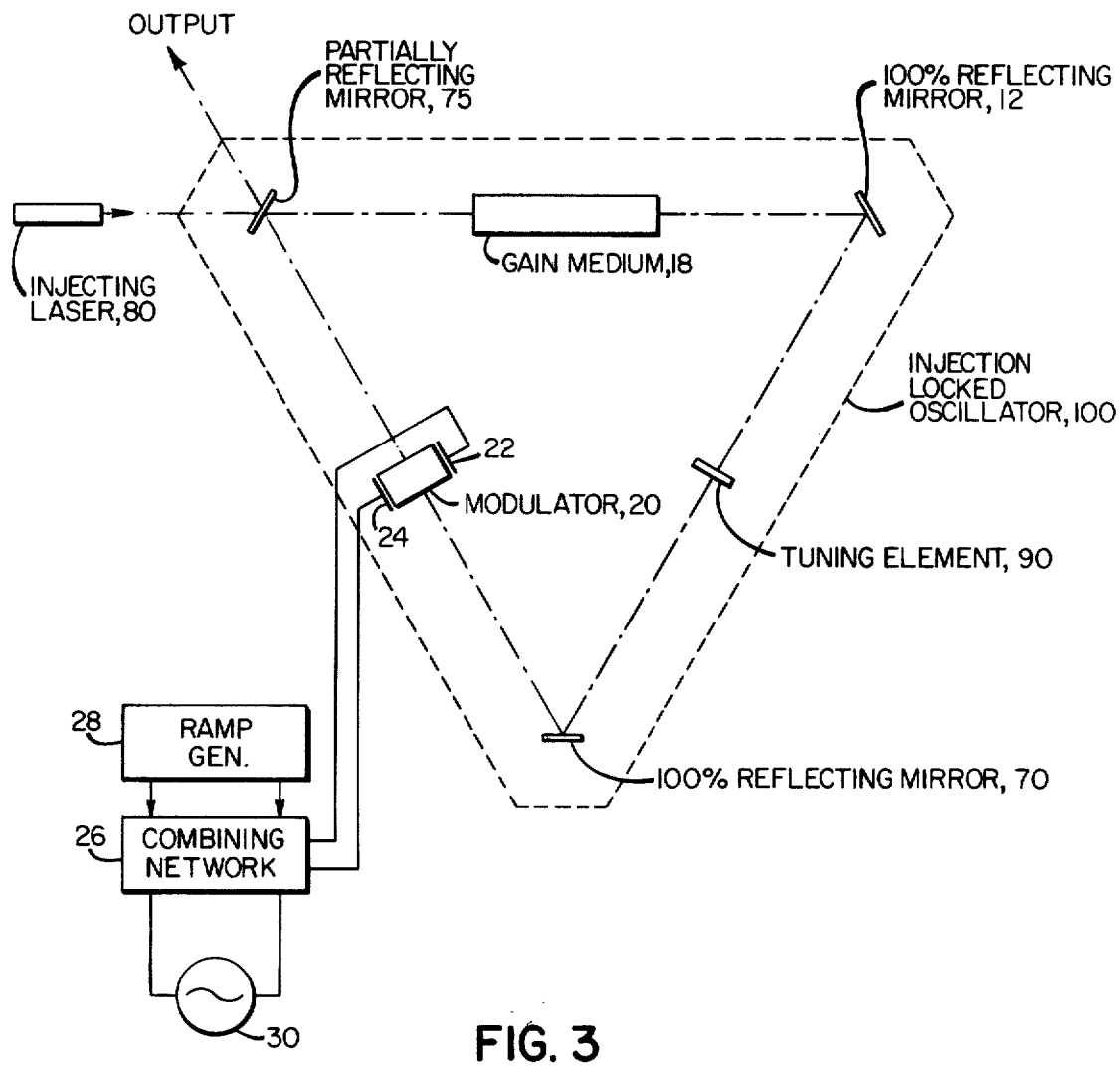

A configuration for an Injection Locked Oscillator (ILO) system is depicted in FIG. 3. As illustrated in this embodiment, the gross spectral features are determined by the spectrum of the injecting laser 80. The ILO 100 is configured as a ring laser having 100% reflecting mirrors 12 and 70, a partially reflecting mirror 75, a tuning element 90, gain medium 18 and modulator 20. In the ring laser a travelling wave is initiated by the injected laser light. As the wave builds in intensity on the successive passes through the amplifying medium, its gross spectral characteristics remain locked to those of the injected light. However the details are modified by the RF mode-locking and chirp caused by modulator 20. The result is that the ILO output, through partially reflecting mirror 75, has the smoothed spectrum brought about by the combination of mode-locking and chirping. The tuning element 90, which may consist of a thin uncoated solid etalon, aids the locking by peaking the overall gain of the system close to the wavelength of the injected signal. This system has been used with a gain medium of Rhodamine 6G dye, pumped with linear pulsed flashlamps, utilizing a 3-meter resonator length, with a ramp swinging through 8 KV in 1 microsecond, and 100 MHz RF modulation of about 50 V. About 100 millijoule of output is obtained per pulse lasting about 1 microsecond, with the gross spectrum locked to the injected wavelength at approximately 600 nanometers. The injected pulse is in the order of microjoules. The relative timing of the two lasers has to be optimized to obtain the required locking. The injected pulse may be itself mode-locked and/or chirped by the techniques described in order to enhance the modulation. In addition, the injected pulse may be electro-optically selected from a chain of mode-locked pulses by standard techniques.

What has been provided is a system which simultaneously mode-locks a laser and chirps its output through the use of one physical phenomenon, cavity length changing. Both physical effects can be accomplished with one element, and, in one embodiment, with superimposed voltages.

The invention is not to be limited by what has been particularly described except as indicated in the appended claims.

What is claimed is:

1. Apparatus for providing mode-locking in the resonant cavity of a radiation producing laser and for chirping its output so as to give the laser a substantially continuous energy spectrum over the frequency of said radiation comprising:
   an electro-optical element disposed in said cavity, said element having an index of refraction which is variable as a function of an applied voltage, said element having a single pair of electrodes for applying said voltage; and,
   means for simultaneously applying a d.c. voltage ramp and a periodically varying voltage to said electrodes, said periodically varying voltage having a frequency for effecting mode-locking in said cavity thereby to produce mode-locked spectral mode lines, and said d.c. voltage ramp being such as to displace said mode-locked spectral mode lines of said laser by an amount at least as great as the mode line separation to provide said continuous energy spectrum.

2. Apparatus for providing mode-locking in a resonant cavity of predetermined effective length of a laser so as to produce radiation having mode-locked spectral lines in the output thereof, and for displacing said mode-locked spectral lines so as to give the output of said laser a substantially continuous energy spectrum with the frequency of said radiation comprising:
   means in said resonant cavity for changing the effective length of said cavity; and,
   means for driving said cavity length means such that the cavity length changing means simultaneously establishes mode-locking and spectral line displacement.

3. The apparatus of claim 2 wherein said driving means includes means for actuating said cavity length changing means such that the length of said cavity is periodically changed, with said periodic change being simultaneously superimposed over a non-periodic change of cavity length.

4. The apparatus of claim 3 wherein the frequency of said periodic cavity length change is near a multiple of an axial mode difference frequency or a multiple thereof.

5. The apparatus of claim 3 wherein the length change produced in said linear change of cavity length is such as to displace a mode line by at least that amount which shifts its position to an adjacent mode line.

6. The apparatus of claim 2 wherein said cavity length changing means includes an electro-optic crystal.

7. The apparatus of claim 6 and further including a single pair of electrodes for said crystal.

8. The apparatus of claim 7 wherein said drive means includes means for applying a periodically varying voltage superimposed on a ramp voltage across said pair of electrodes.

9. A method for mode-locking radiation in a resonant cavity of predetermined effective length of a laser and chirping said radiation, comprising:
   changing the effective length of said resonant cavity by means of an electro-optical element driven with a characteristic that simultaneously establishes mode-locking and chirping, whereby both effects are achieved through one physical phenomenon operating at one location in the laser cavity.

10. The method of claim 9 wherein said driving step effects a periodically varying change of cavity length superimposed on a non-periodic change of cavity length.

11. A laser-pumped laser system comprising:
a pumping laser having a resonant cavity of predetermined effective length, pumping means, a gain medium disposed in said cavity, means for energy extraction from said cavity and means for mode-locking said pumping laser including a source of periodically varying voltage;
a pumped laser having a resonant cavity of the same predetermined effective length as said pumping laser, a gain medium disposed in the cavity of said pumped laser, means for extracting energy from said cavity, means at one location in the pumped laser cavity for changing the effective length thereof, means for driving said cavity length changing means such that said cavity length changing means establishes mode-locking and spectral line displacement, said driving means including means for applying a phase-corrected version of said periodically-varying voltage to said cavity length changing means for effecting mode-locking of said pumped laser; and,
means for directing the output of said pumping laser into the gain medium of said pumped laser for the pumping thereof.

12. The system of claim 11 wherein said cavity length changing means includes an electro-optic crystal which changes its refractive index in response to an applied voltage.

13. The system of claim 12 and further including a single pair of electrodes for said cyrstal, said electrodes being coupled to said phase-corrected, periodically-varying voltage, said drive means further including a voltage ramp generator, and means for coupling the output of said voltage ramp generator to said electrodes.

* * * * *